(12) United States Patent
Robinson et al.

(10) Patent No.: US 11,331,894 B2
(45) Date of Patent: May 17, 2022

(54) METHOD OF MANUFACTURING A LOAD STRUCTURE

(71) Applicant: Gemini Group, Inc., Bad Axe, MI (US)

(72) Inventors: Mark Robinson, Bad Axe, MI (US); Russell R. Talaski, Ubly, MI (US); Allen Weber, Minden City, MI (US)

(73) Assignee: GEMINI GROUP, INC., Bad Axe, MI (US)

( * ) Notice: Subject to any disclaimer, the term of this patent is extended or adjusted under 35 U.S.C. 154(b) by 0 days.

(21) Appl. No.: 16/251,918

(22) Filed: Jan. 18, 2019

(65) Prior Publication Data

US 2019/0375204 A1 Dec. 12, 2019

Related U.S. Application Data

(60) Provisional application No. 62/682,611, filed on Jun. 8, 2018.

(51) Int. Cl.
| | |
|---|---|
| *B29C 45/14* | (2006.01) |
| *B32B 3/12* | (2006.01) |
| *B62D 25/20* | (2006.01) |
| *B32B 37/12* | (2006.01) |
| *B32B 7/12* | (2006.01) |

(Continued)

(52) U.S. Cl.
CPC ............ *B32B 37/1284* (2013.01); *B32B 3/12* (2013.01); *B32B 7/12* (2013.01); *B32B 17/065* (2013.01); *B32B 29/02* (2013.01); *B32B 2255/02* (2013.01); *B32B 2255/26* (2013.01);

(Continued)

(58) Field of Classification Search
CPC .... B29C 45/14344; B29C 2045/14967; B32B 2305/024; B32B 2255/02
See application file for complete search history.

(56) References Cited

U.S. PATENT DOCUMENTS 3,912,569 A * 10/1975 Kapral .................. B44C 5/0469
156/230
4,552,913 A 11/1985 Wolfe et al.
(Continued)

FOREIGN PATENT DOCUMENTS

| DE | 10310368 A1 | 10/2004 |
|---|---|---|
| DE | 102015002358 A1 | 8/2016 |

(Continued)

OTHER PUBLICATIONS

EESR EP19179003.
European Communication Pursuant to Article 94(3) EPC dated Aug. 12, 2020.

*Primary Examiner* — George R Koch
*Assistant Examiner* — Christopher C Caillouet
(74) *Attorney, Agent, or Firm* — Fishman Stewart PLLC (57) ABSTRACT

A method of manufacturing a load structure may include first forming a panel having a first side and a second side. The method may then include trimming the panel, including clearing a fill passage through the panel from the first side to the second side. The method may then include applying an over rim coating on the second side of the panel via an over rim tool by which a resin may be injected through the fill passage to the second side. The method may further include performing final trimming of the panel, and finally performing final assembly to form the load structure.

20 Claims, 8 Drawing Sheets

(51) Int. Cl.
    *B32B 17/06*     (2006.01)
    *B32B 29/02*     (2006.01)

(52) U.S. Cl.
    CPC ..... *B32B 2305/024* (2013.01); *B32B 2471/00* (2013.01); *B62D 25/20* (2013.01)

(56) References Cited

U.S. PATENT DOCUMENTS

| | | |
|---|---|---|
| 4,783,298 A | 11/1988 | Oda |
| 5,964,491 A | 10/1999 | Marsh et al. |
| 2003/0044548 A1 | 3/2003 | Kaufmann |
| 2003/0143373 A1* | 7/2003 | Bledsoe ................ B29C 70/088 |
| | | 428/138 |
| 2004/0018789 A1* | 1/2004 | Marchbanks ..... B29C 45/14811 |
| | | 442/221 |
| 2010/0052211 A1 | 3/2010 | Chen et al. |
| 2013/0154150 A1* | 6/2013 | Shimazoe ........... H01M 8/0276 |
| | | 264/161 |
| 2016/0176153 A1 | 6/2016 | Dietz et al. |
| 2018/0290418 A1* | 10/2018 | Nelson ..................... B32B 7/08 |

FOREIGN PATENT DOCUMENTS

| | | |
|---|---|---|
| EP | 0492532 A2 | 7/1992 |
| FR | 2757794 A1 | 7/1998 |
| FR | 2913385 A1 | 9/2008 |
| JP | S5742713 A | 3/1982 |
| JP | H07171847 A | 7/1995 |

\* cited by examiner

METHOD OF MANUFACTURING A LOAD STRUCTURE

CROSS-REFERENCE TO RELATED APPLICATION

This application is a Non-Provisional U.S. Utility Application which claims priority of Provisional Application No. 62/682,611, filed on Jun. 8, 2018 and is hereby incorporated by reference in its entirety.

FIELD OF TECHNOLOGY

The present disclosure pertains to a method of manufacturing a load structure that may be employed, for example, but not limited to, in a vehicle where a load is applied, such as a floor, roofing, and the like.

BACKGROUND

Load structures are incorporated in various applications, for example, as floors, roofing, and the like, in automobiles and other vehicles. The load structures generally are panels having a first side, which may be visible, and a second side, that may be concealed. In some applications, the visible side (sometimes referred to as the "A-side") may be carpeted, and the concealed side (sometimes referred to as the "B-side") may be left bare or have scrim, such as felt, added thereto. The load structure may be installed in a location susceptible to mud, water, high-vapor, and the like. To protect the load structure from such elements, a floor mat is often added over the load structure, which may add weight and additional cost. Another method is to adhesively bond a layer of thermoplastic olefin (TPO), vinyl or similar material to the panel, which is expensive and heavy.

Accordingly, an improved load structure is presented that has reduced weight and/or cost while still providing protection from weather elements, such as mud and water.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present disclosure. Further, the embodiments set forth herein are not intended to be exhaustive or otherwise limit or restrict the claims to the precise forms and configurations shown in the drawings and disclosed in the following detailed description.

DETAILED DESCRIPTION

Figure 14:
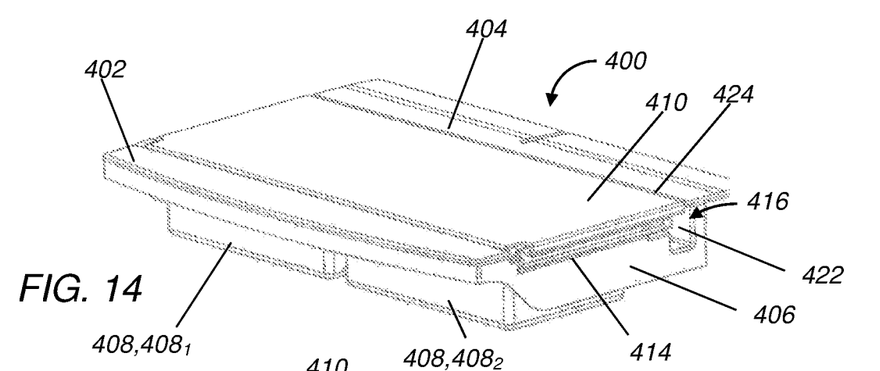
FIGS. 14-16 are different views of a load structure according to another exemplary approach.
Figure 15:
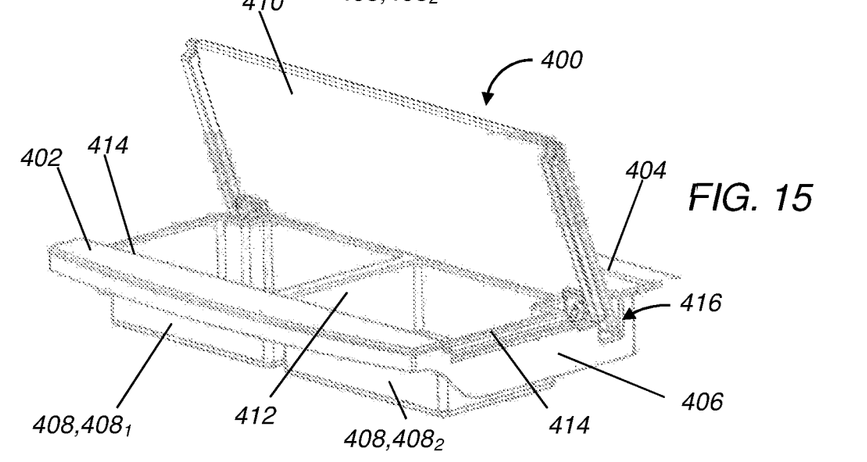
Figure 16:
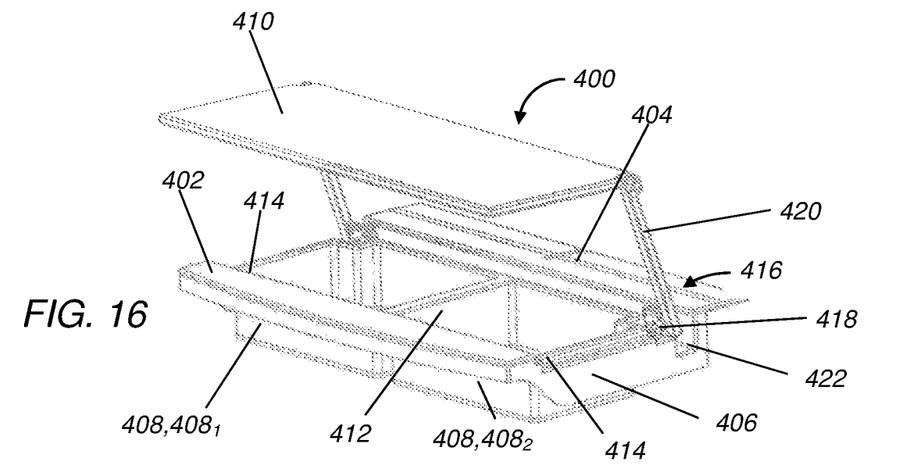

Referring to the figures, FIGS. 1-4 depict load structures 10 according to different exemplary approaches. While the load structures 10 are depicted as a vehicle load floor, it should be appreciated that the load structure may be used and/or embodied in a number of other applications and/or structures, including, but not limited to, floor panels, floor mats, load floors, tail gates, hoods, body panels, vehicle members, vehicle components, component structures, structural members, aircraft members, vessel members, consumer goods, tables, walls, construction members, building components, stall dividers, semi-trailers, truck components, truck beds, cargo vans, and utility trailers. For example, as seen in FIGS. 14-16, the load structures 10 may be embodied as adjustable storage lids in a vehicle, as described in more detail hereinafter.

The load structure 10 generally may include a panel 12, which may have a hollow construction. The panel 12 may have a core 14, which may be made of a honeycomb paper 16 with a layer of glass 18 over the honeycomb paper 16. The glass layer may be random or oriented. The panel 12 may also include a polyurethane coating 20 around the core 14. The polyurethane coating 20 may be a foaming or a non-foaming structure. The polyurethane coating 20 generally provides a cosmetic, cleanable, and waterproof surface, and further allows for the feel, texture, hardness, and/or color of the finished product be changed.

Figure 1:
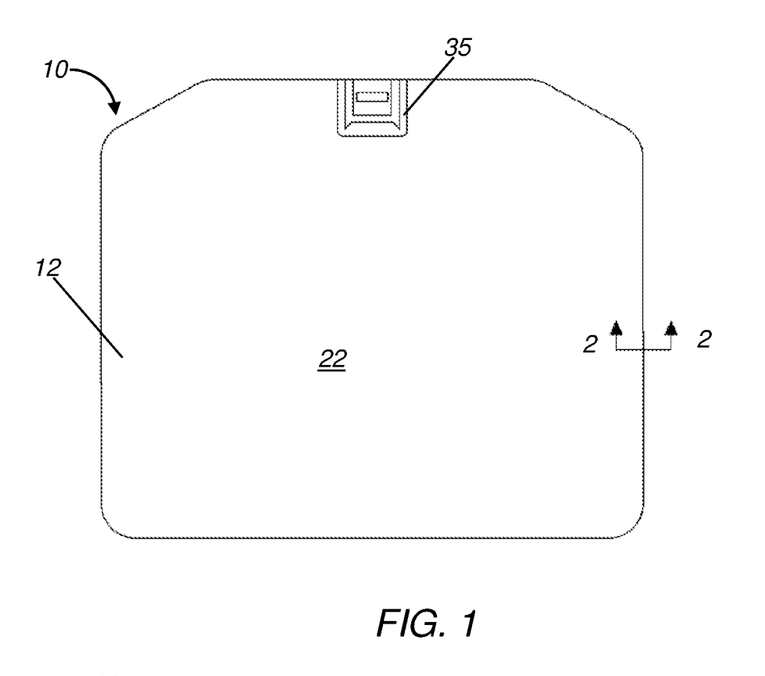
FIG. 1 is a top view of an exemplary load structure having a non-edge-wrapped configuration.
Figure 2:
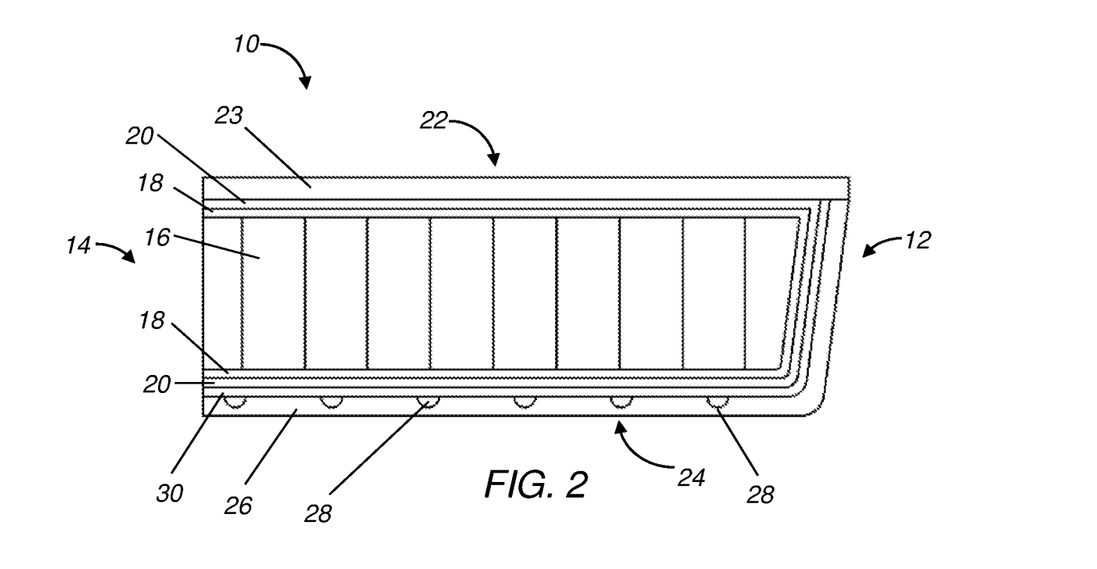
FIG. 2 is a partial cross-section through the load structure of FIG. 1 taken from the perspective of arrows 2-2.

For aesthetics, the panel 12 may be covered on its first side 22 with a layer 23 of various weights of woven and/or non-woven carpets, felt, or similar material. The second side 24 of the panel 12 may be covered with a lighter weight, non-woven, or the glass urethane layer can be left exposed. The first side 22 may be the side exposed to the consumer/user (sometimes referred to as the "A-side"), while the second side 24 may be concealed (sometimes referred to as the "B-side"). Alternatively, the first side 22 may be the B-side, and the second side 24 may be the A-side. In certain embodiments, the load structure 10 may have a non-edge-wrapped configuration in which the layer 23 may be disposed primarily on the first side 22, as illustrated in FIGS. 1 and 2. In other embodiments, the load structure 10 may have an edge-wrapped configuration in which the layer 23 may wrap around an edge of the panel 12 from the first side 22 to the second side 24 at least partially along a perimeter of the panel 12. The layer 23 of carpet or felt may have a thermoplastic polyurethane (TPU) backing (for example, in the non-edge-wrapped configuration and/or may be applied or adhered to the panel 12 via an adhesive (for example, in the edge-wrapped configuration).

The load structure 10 may also include an over rim coating 26 on at least the second side 24 of the panel 12. The over rim coating 26 generally may be formed from a resin injected on to the second side 24, as described in more detail hereinafter. The resin may be, but is not limited to, a polyurethane that may be elastomeric or rigid and/or aromatic or aliphatic. As merely one example, the over rim coating 26 may have a thickness ranging between 0.5 mm and 4.0 mm.

The panel 12 may be formed with one or more protrusions 28 that protrude from the second side 24 of the panel 12. The protrusion(s) 28 generally may be provided to help maintain the shape of the panel, e.g., prevent or minimize deflection of the panel 12 due to its span/width, during the injection process of the resin for the over mold coating 26, and ensure that the resin coats the correct side of the panel 12. The protrusion(s) 28 may be "bumps" with rounded surfaces. Alternatively, or in addition, the protrusion(s) 28 may be elongated ribs, though it should be appreciated that the protrusion(s) 28 may have any geometric configuration to maintain the shape of the panel 12 and ensure that the resin coats the correct side of the panel 12. The protrusion(s) 28 may have a height less than the thickness of the over rim coating 26 such that the over rim coating 26 covers the protrusion(s) 28. For example, the height may be a maximum of 0.2 mm less than the thickness of the over rim coating 26.

The load structure 10 may further include a barrier layer 30 on at least the second side of the panel 12 before the over rim coating 26. The barrier layer 30 generally may provide a barrier to the resin of the over rim coating 26 from seeping into the core 14 during the injection process due to the injection pressure associated therewith, which could add weight, cost, and quality issues with the load structure 10. The material of the barrier layer 30 may be a glass, fiber, scrim (e.g., polyester, nylon, etc.), paper, or thermoplastic polyurethane (TPU) or a combination thereof. Where the barrier material is glass, fiber, scrim, or paper, the barrier layer 30 may be disposed on the panel 12 before the polyurethane layer 20. Where the barrier material is TPU, the barrier layer 30 may be disposed on the panel on top of the polyurethane layer 20, as described in more detail hereinafter. The barrier layer 30 may allow the over rim coating 26 to be injected at greater fill pressures without a vacuum. As such, the panel 12 may be molded in its intended color, and therefore, does not need to be coated with a paint layer or sanded in preparation of such painting, thereby further simplifying the manufacturing process. The resulting structure 10 may be color matched to a customer's desired finishing. The barrier layer 30 may be liquid applied sealer, brushed, sprayed or roll coat applied to seal the surface adequately to prevent penetration of over rim material during the injection process, post applied to the panel 12 after it is formed or applied to panel forming tool and bonded as the panel 12 is formed. The liquid sealer generally may be compatible with both the materials used to form the panel 12 and the over rim materially, and do not degrade during processing.

Figure 3:
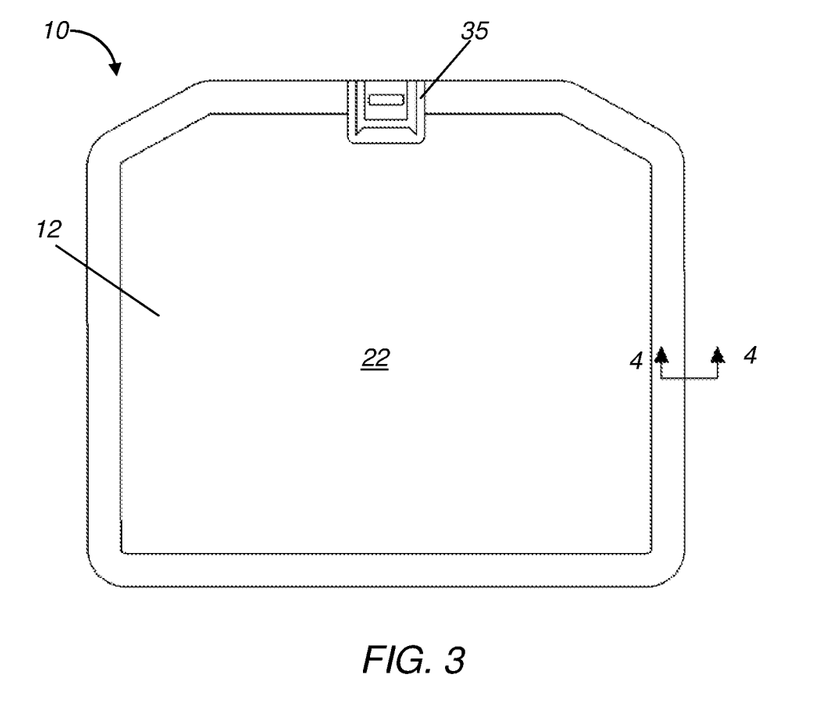
FIG. 3 is a top view of an exemplary load structure having an edge-wrapped configuration.
Figure 4:
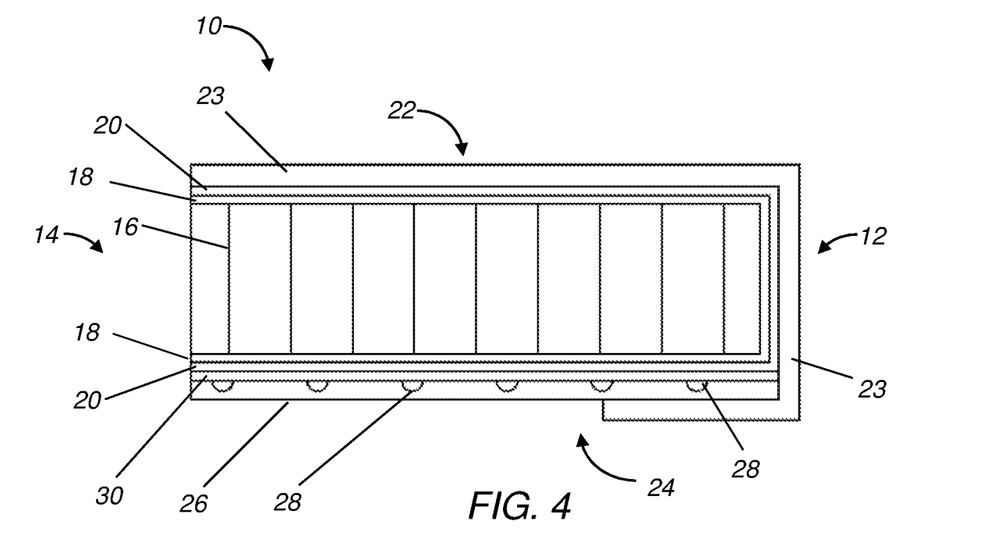
FIG. 4 is a partial cross-section through the load structure of FIG. 3 taken from the perspective of arrows 4-4.
Figure 5:
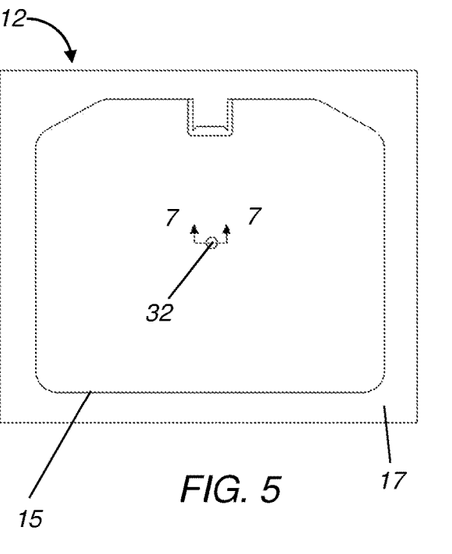
FIG. 5 is a top view of an un-trimmed panel for the load structure of FIGS. 1 and 2.
Figure 6:
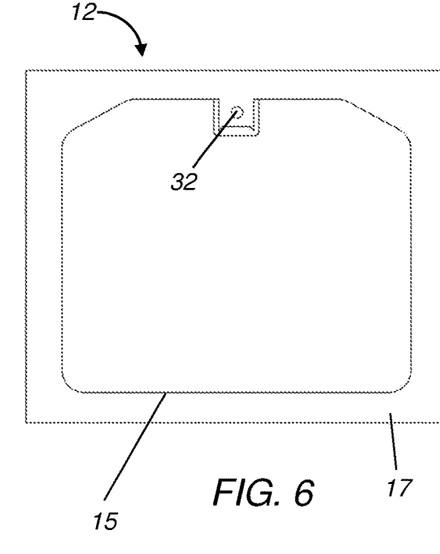
FIG. 6 is a top view of an un-trimmed panel for the load structures of FIGS. 3 and 4.
Figure 7:
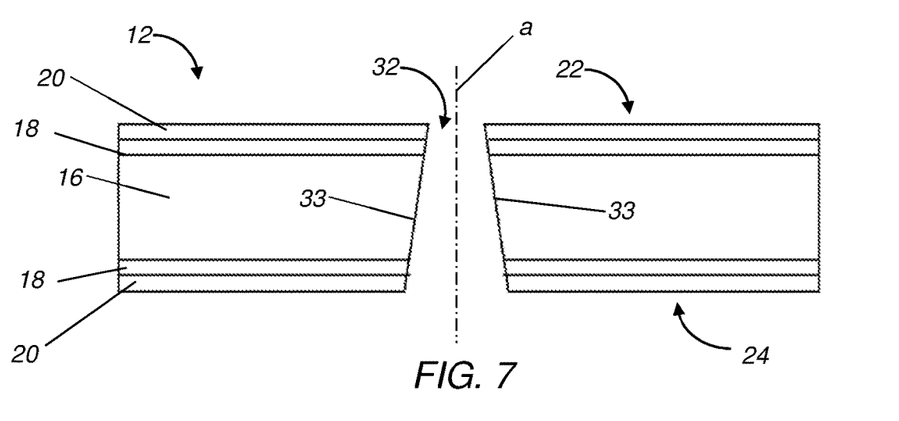
FIG. 7 is a partial cross-section through the untrimmed panels of FIGS. 5 and 6 taken from the perspective of arrows 7-7.

In the injection process, it is desirable to have laminar flow and low pressure. Because polyurethane systems have a relatively high viscosity, they generally may be 2-part requiring high pressure impingement mixing, the cross-sectional area of the flow path may be relatively small, string gel times may be relatively short, and the available time to inject can be long in comparison. Resistance to flow can create significant back pressure at fill, which means, if the barrier layer is not adequate, some urethane may penetrate into the core. If this penetration occurs, a certain amount of air may be displaced, and may leak into the coating layer at a lower pressure area, causing an imperfection, such as a blister.

Where the load structure 10 has a non-edge-wrapped configuration such as illustrated in FIGS. 1 and 2, the load structure 10 may also include a fill passage 32 through the panel 12 from the first side 22 to the second side 24, as seen in FIG. 5. The fill passage 32 generally may be the passage through which the resin is injected to coat the second side 24 with the over rim coating 26. The fill passage 32 may be located within the footprint of the final load structure 10, for example, centrally located, as the carpet or felt layer 23 will cover the fill passage 32. Where the load structure 10 has an edge-wrapped configuration, as illustrated in FIGS. 3 and 4, the fill passage 32 may not be included in the final load structure, but rather may be located outside of the footprint that is trimmed and discarded after the injection process, as seen in FIG. 6, and described in more detail hereinafter. The fill passage 32 may be located in a space that is not where the material of carpet or felt 23 is located (see FIG. 6). In either configuration, the fill passage 32 may be tapered 33 from the second side 24 to the first side 22, as seen in FIG. 7. For example, the fill passage 32 may have a slope of 4 degrees with respect to an axis a of the fill passage 32.

In either configuration, the load structure 10 may further include a handle 35 or any other external feature attached to the panel 12. (See FIG. 12)

Figure 12:
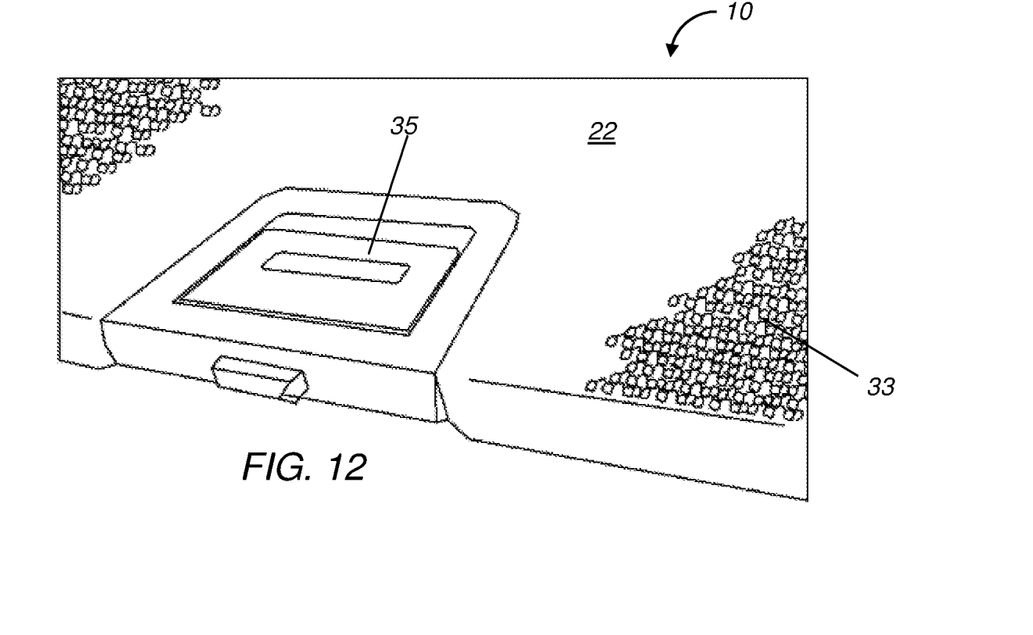
FIGS. 12 and 13 are partial perspective views of a top (or "A-side") and a bottom (or "B-side"), respectively, of an exemplary load structure.
Figure 13:
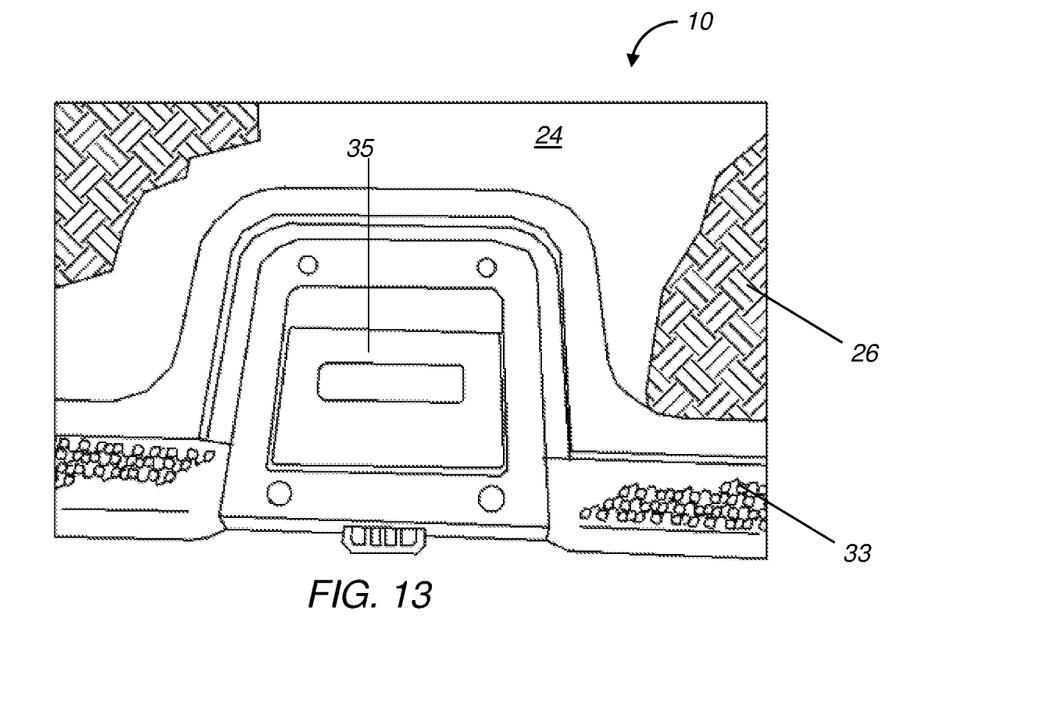

Referring now to FIGS. 12 and 13, the load structure 10 is shown in a perspective view depicting the FIG. 1 structure. In this embodiment, the load structure 10 is a releasable and repositionable vehicle member that can be located in the rear section of the vehicle whereby articles may be placed thereon. The load structure 10 is suited for accommodating dry, wet, heavy and light weight articles that may be placed thereon. The load structure 10 is operable to deflect minimally under wet and dry conditions. This is partially accomplished due to the reinforced honeycomb structure at the core of the load structure 10 coupled with the inclusion of the moisture impervious layer on at least one side (22 and/or 24) of the system. It will be appreciated that while FIGS. 12 and 13 show a moisture impervious layer on one side (side 24), that both sides may have a moisture resistant feature so as to enhance the integrity of the load structure 10. Thus, in one embodiment a unitary load structure 10 is provided that has a moisture impervious layer on one side, a consumer-friendly layer with carpet and the like on the other side, all combined with an improved core. Alternatively, a unitary load structure 10 may be provided that has a moisture impervious layer around the entire exterior surface (22, 24 and all sides and ports) in combination with an improved core. Thus, the load structure 10 may be sealed and provide a moisture impervious layer or feature about its entire exterior surface. Such structure would be highly impervious to moisture conditions thus making the load structure attractive for use with wet gear, swimming gear, fishing gear, hunting gear, skiing equipment, and the like. Also, for those consumers that tailgate at sporting events, a load structure 10 is provided that has a moisture resistant cleanable surface that can be easily cleaned up after events. For example, the load structure 10 may be removed from a vehicle and washed, dried and repositioned back in to the vehicle. A handle, described herein, may be deployed to releasably permit the load structure 10 to be selectively detached form the vehicle. Thus, the load structure 10 is securable and lockable. It will be appreciated that the surface 24 may include a surface treatment that permits it to be more easily cleaned and sanitized for consumer use situations.

With continued reference to FIG. 12, it illustrates the first side 22 (or "A-side) and FIG. 13 illustrates the second side 24 (or "B-side"). As seen in FIG. 12, the first side 22 has a layer 33 of carpet or felt covering it. As seen in FIG. 13, the second side 24 may have an over rim coating 26 on at least a portion thereof, and a layer 33 of carpet or felt wrapped around an edge, though it should be appreciated that the second side 24 may have no carpet 33 wrapped around the edge. The load structure 10 has a handle 35 that may be accessible from either the first side 22 or the second side 24. This enables a user the option of having either the first side 22 or the second side 24 exposed, while still maintaining the functionality associated with the handle 35. Thus, the load structure 10 is reversible, symmetrically designed, resulting in a consumer being able to deploy a finished carpet like surface or a utilitarian like surface where dirty and wet articles can be placed on the load structure 10 without diminishing its integrity.

Figure 8:
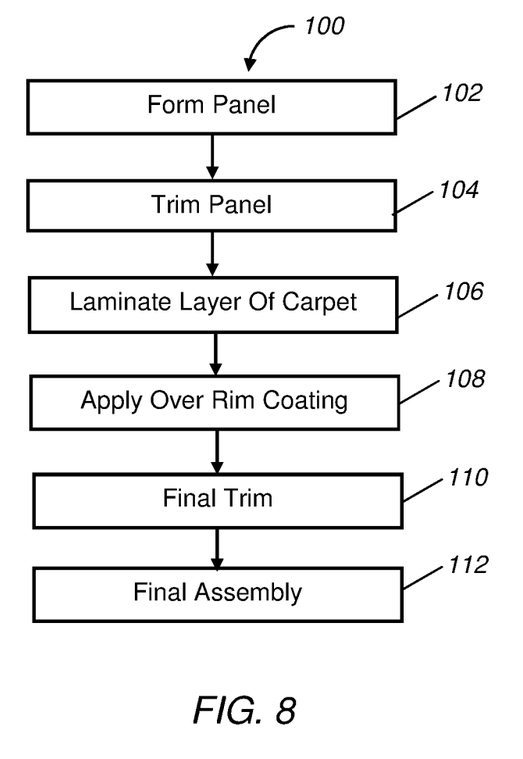
FIG. 8 is a schematic flow diagram of an exemplary process for manufacturing the load structure of FIGS. 1 and 2.

Referring now to FIG. 8, an exemplary process 100 for manufacturing a load structure 10 having a non-edge wrapped configuration, as illustrated in FIGS. 1 and 2, is shown. Process 100 may begin at step 102 in which the panel 12 may be formed. This step may involve transporting a core 14 of material, e.g., paper honeycomb 16 with a glass layer 18 around the honeycomb 16, from a load station to a spray cell. In one exemplary approach, such transporting may be done by a robot with an end of arm tool designed to grip the core 14 in a non-critical area. The core 14 may then be coated with a polyurethane layer 20 with a 2-part polyurethane system, with an amount adequate to encapsulate the glass and bond to the underlying paper honeycomb. The polyurethane may be spray-applied in an even layer over the surface of the core 14, with additional urethane applied where required to fill geometry.

The sprayed core 14 may then be placed into a heated mold. The mold which generally may have the basic geometry of the panel 12, including a footprint of the final load structure 10 and additional material to be trimmed later in process 100, as seen in FIG. 5. The basic geometry may also include one or more protrusions 28 on the second side 24 of the panel 12, as described above. The mold may then be closed for a duration long enough to cure the polyurethane and form the panel 12.

Step 102 may also include coating the panel 12 with a barrier material. As explained above, where the barrier material is glass, fiber, scrim, or paper, the barrier material may be disposed on the panel 12 before applying the polyurethane layer 20. Where the barrier material is TPU, the barrier material may be disposed on the panel on top of the polyurethane layer 20. For example, the TPU may be placed as a film within the mold prior to the core 14 being placed therein. Then, when the mold is closed and heated, the TPU may be applied, as described in more detail hereinafter. The mold generally may have the basic geometry of the panel 12, including the fill passage 32.

After step 102, process 100 may proceed to step 104 at which the panel 12 may be trimmed. After the polyurethane which created the structure and shape of the panel has cured, the part may be removed from the mold, conditioned, e.g., trimmed (about its perimeter and elsewhere as needed) in a second tool, and the fill passage 32 may be cleared. As seen in FIG. 6, the fill passage 32 may be located outside of the final footprint of the load structure 10.

After step 104, process 100 may proceed to step 106 at which the first side 22 of the panel 12 may be provided, e.g., laminated with carpet 23, felt, or a similar material. A piece of felt or carpet laminated to a TPU film having a thickness, for example, of 1.5-2.5 mm thick, may be cut larger than the footprint of the trimmed panel, for example, by an extended 10-13 mm from a perimeter of the panel footprint. The piece of felt or carpet may then be laminated to the side opposite of the side to be coated, over lapping the edge of the part by a certain amount, for example, by 10-13 mm. This may be accomplished by use of a reactive adhesive, including, but not limited to, polyurethane. The piece of felt or carpet, which generally may be rectangular shaped, may have four holes (one per corner) outside the perimeter of the part for use in locating in the over rim mold. However, it should be appreciated that it may have more or less holes, and further, that the geometry of the piece of felt or carpet may be any other polygonal and/or circular/curved shape.

Figure 10:
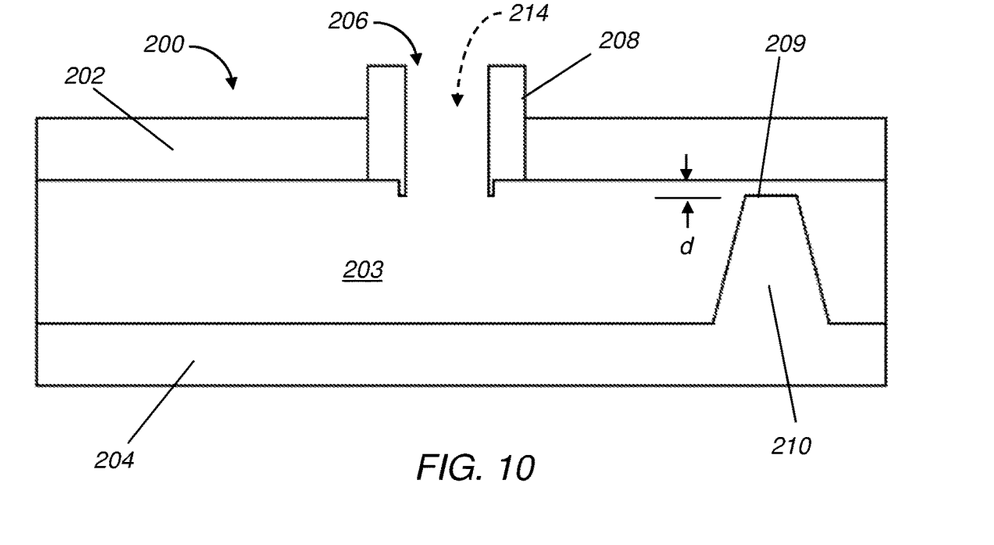
FIG. 10 is a schematic cross-section of an over mold tool used in the processes of FIGS. 5 and 6.
Figure 11:
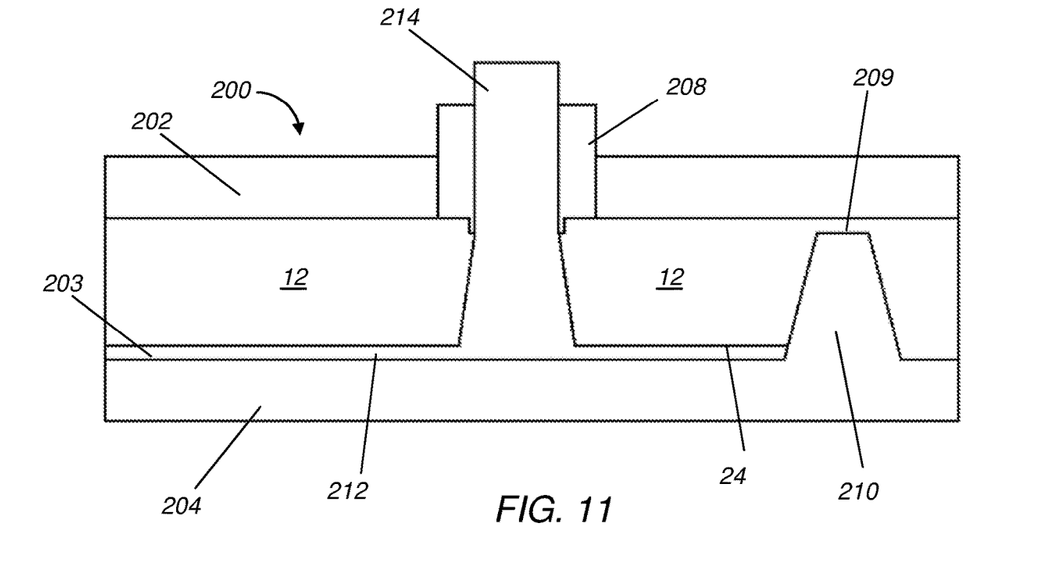
FIG. 11 is a schematic cross-section of the over mold tool of FIG. 7 with a panel inserted therein.

After step 106, process 100 may proceed to step 108 at which the panel 12 may be over rimmed, i.e., the over rim coating 26 may be applied to the second side 24 of the panel 12 as shown in FIG. 4. The over rimming may be performed by an over rim tool 200, as illustrated in FIGS. 10 and 11. Referring now to FIGS. 10 and 11, the over rim tool 200 may include an upper tool part 202 and a lower tool part 204 defining a cavity 203 therebetween when the over rim tool 200 is closed, in which the panel 12 is to be placed. The upper tool part 202 may include an opening or passage 206 through which an injection gun 208 may be inserted or fitted or otherwise attached to the upper tool part 202 for injecting the resin 214. The lower tool part 204 may include a projection 210 extending towards the upper tool part 202. When the over rim tool 200 is closed, an end 209 of the projection 210 may be spaced apart from the upper tool part 202 by a distance d, which may range from 0.5 mm to 4.0 mm.

The panel 12 may be placed in the cavity 203 of the over rim tool 200 with the first side 22 up, i.e., facing the upper tool part 202, and the second side 24 down, i.e., facing the lower tool part 202. When the over rim tool 200 is closed, as illustrated in FIG. 11, the projection 210 may pinch or seal the panel 12 against the upper tool part 202 such that there may be a gap 212 between the second side 24 of the panel 12 and the lower tool part 204. The gap 212 generally may define the thickness of the over rim coating 26 and may have the same dimension as the distance d between the end 209 of the projection 210 and the upper tool part 202. The excess carpet or carpet flange may be tramped between the upper and lower tool parts 202, 204, forming a seal around the perimeter of the part, except those locations where venting may be required, allowing air being displaced by the over rim coating 26 to escape.

Once the panel 12 is secured in the over rim tool 200, the resin 214 may be injected via the injection gun 208 through the fill passage 32 in the panel 12 until the gap 212 is filled. The fill pressure at which the resin 214 may be injected generally may be dependent upon such factors, including, but not limited to, gel time of the resin 214 and the amount of resin 214 needed for the over rim coating, and may range, for example, from 2 bar to 200 bar.

After step 108, process 100 may proceed to step 110 at which the panel 12 may undergo final trimming. The panel may be removed from the mold and placed in a second trim tool, which may be designed to remove any excess carpet flange and fill location to the final footprint of the load structure 10.

Process 100 may end after step 112 during which the panel may undergo final assembly, for example, by attaching a handle, hardware or other external feature(s) to the panel.

Figure 9:
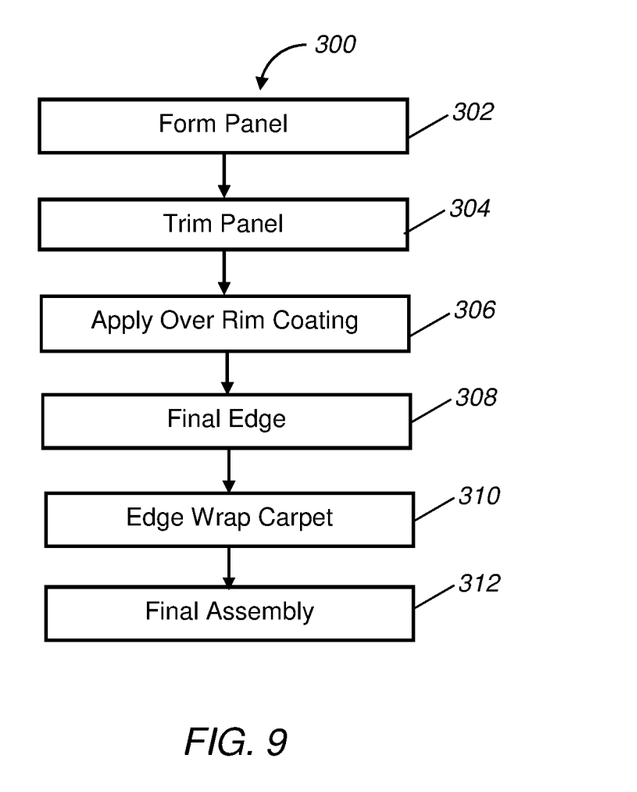
FIG. 9 is a schematic flow diagram of an exemplary process for manufacturing the load structure of FIGS. 3 and 4.

Referring now to FIG. 9, an exemplary process 300 for manufacturing a load structure 10 having an edge-wrapped configuration, as illustrated in FIGS. 3 and 4, is shown. Process 300 may begin at step 302 in which the panel 12 may be formed. This step may involve transporting a core 14 of material, e.g., paper honeycomb 16 with a glass layer 18 around the honeycomb 16, from a load station to a spray cell. In one exemplary approach, such transporting may be done by a robot with an end of arm tool designed to grip the core 14 in a non-critical area. The core 14 may then be coated with a polyurethane layer 20 with a 2-part polyurethane system, with an amount adequate to encapsulate the glass and bond to the underlying paper honeycomb. The polyurethane may be spray-applied in an even layer over the surface of the core 14, with additional urethane applied where required to fill geometry.

The sprayed core 14 may then be placed into a heated mold. The mold which generally may have the basic geometry of the panel 12, including a footprint of the final load structure 10 and additional material to be trimmed later in process 300. The basic geometry may also include one or more protrusions 28 on the second side 24 of the panel 12, as described above. The mold may then be closed for a duration long enough to cure the polyurethane and form the panel 12.

Step 302 may also include coating the panel 12 with a barrier material. As explained above, where the barrier material is glass, fiber, scrim, or paper, the barrier material may be disposed on the panel 12 before applying the polyurethane layer 20. Where the barrier material is TPU, the barrier material may be disposed on the panel on top of the polyurethane layer 20. For example, the TPU may be placed as a film within the mold prior to the core 14 being placed therein. Then, when the mold is closed and heated, the TPU may be applied, as described in more detail hereinafter. The mold generally may have the basic geometry of the panel 12, including the fill passage 32.

After step 302, process 300 may proceed to step 304 at which the panel 12 may be conditioned, e.g., trimmed. After the polyurethane which created the structure and shape of the panel has cured, the part may be removed from the mold, trimmed (perimeter) in a second tool, and the fill passage 32 may be cleared. As seen in FIG. 5, the fill passage 32 may be located within the final footprint of the load structure 10.

After step 304, process 300 may proceed to step 306 at which the panel 12 may be over rimmed, i.e., the over rim coating 26 may be applied to the second side 24 of the panel 12. The over rimming may be performed by an over rim tool 200, as illustrated in FIGS. 10 and 11. The panel 12 may be placed in the cavity 203 of the over rim tool 200 with the first side 22 up, i.e., facing the upper tool part 202, and the second side 24 down, i.e., facing the lower tool part 202. When the over rim tool 200 is closed, as illustrated in FIG. 11, the projection 210 may pinch or seal the panel 12 against the upper tool part 202 such that there may be a gap 212 between the second side 24 of the panel 12 and the lower tool part 204. The gap 212 generally may define the thickness of the over rim coating 26 and may have the same dimension as the distance d between the end of the projection 210 and the upper tool part 202.

Once the panel 12 is secured in the over rim tool 200, the resin 214 may be injected via the injection gun 208 through the fill passage 32 in the panel 12 until the gap 212 is filled. The fill pressure at which the resin 214 may be injected generally may be dependent upon such factors, including, but not limited to, gel time of the resin 214 and the amount of resin 214 needed for the over rim coating, and may range, for example, from 2 bar to 200 bar.

After step 306, process 300 may proceed to step 308 at which time the panel 12 may undergo final trimming. The panel may be removed from the mold and placed in a second trim tool, which may be designed to remove any excess material, i.e., the material beyond the footprint of the load structure 10, including where the fill passage 32 is located.

After step 308, process 300 may proceed to step 310 at which the edge may be wrapped. A piece of carpet die-cut to a specific shape may be attached to the first side 22 of the panel 12 and wrapped around the edges of the panel 12 to the second side 24 at least partially along a perimeter of the panel 12, ending after overlapping a portion of the over rim coating 28.

Process 300 may end after step 312 during which the panel may undergo final assembly, for example, by attaching a handle or other external feature to the panel.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Referring now to FIGS. 14-16, a vehicle component 400 according to one exemplary approach is illustrated. While the vehicle component 400 is illustrated as a storage compartment, for example, in a trunk of a vehicle, it should be appreciated that the vehicle component may be any other component in a vehicle. The vehicle component 400 generally may have a front trim member 402, a rear trim member 404, and side walls 406 therebetween that define a compartment 408. The front and rear trim members 402, 404 may allow the vehicle component 400 to be installed within a vehicle, not shown. The vehicle component 400 may also include a divider wall 412 that may divide the compartment 408 into sub-compartments $408_1$ and $408_2$. It should be appreciated that there may be multiple divider walls 412 that divide the compartment 408 into more than two sub-compartments, and further that the sub-compartments may be the same or different size, shape, and/or configuration depending upon the location and orientation of the divider wall(s) 412.

The vehicle component 400 may further include a stowable repositionable cover 410 configured to cover all or portions of the compartment 408. The stowable cover 410 may be a load structure 10, as described above, and may have an edge-wrapped configuration or a non-edge wrapped configuration. The stowable cover 410 may be movable from a closed position, as illustrated in FIG. 14, to an open position as is shown in FIG. 15, to a fully deployed position (as shown in FIG. 16) in which the cover 410 may be elevated in the air and substantially level so that it may be usable as a shelf or platform. Thus, the component 400 can be a locatable shelf that can be stowed in the vehicle. The side walls 406 and the front trim member 402 generally may include a mating edge 414, which may be depressed such that the cover 410 may sit flush with the front trim member 402 and/or the rear trim member 404. The cover 410 may be attached to each side wall 406 via a pivoting mechanism 416, which may include, but is not limited to, a hinge 418 and an extension member 420 connecting the hinge 418 and the cover 410. The pivoting mechanism 416 generally may enable the cover 410 to rotate from the closed position, as seen in FIG. 14, to a deployed position as is shown in FIG. 16. As further seen in FIG. 14, the vehicle component 400 may include a rear transversely extending channel 422 into which a rear edge 424 of the cover 410 may rotate into. The extension member 420 may have a latch at one end for securing the cover 410 in to the horizontal position shown in FIG. 16. This construction provides a secure table-like construction for a consumer to place articles thereon, such as for example, when tailgating at a sporting event. The cover 410 may further be rotatably connected to the extension member 420 such that it may rotate out into the deployed position (FIG. 16) to the stored position as is shown in FIG. 14.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method of manufacturing a load structure for use in an automotive application inside of a vehicle where a load may be applied on to the load structure, the method comprising:
   forming a panel having a first side and a second side;
   trimming the panel, including clearing a fill passage through the panel from the first side to the second side;
   laminating a material to the first side of the panel;
   applying an over rim coating on a portion of the second side of the panel via a tool by which a resin is injected through the fill passage to the second side;
   trimming the panel to a final footprint of the load structure; and
   performing final assembly to form the load structure;
   wherein the fill passage is tapered with a 4 degree slope from the second side to the first side.

2. The method of claim 1, wherein forming the panel includes:
   applying a coating of polyurethane to a top surface and a bottom surface of a core; and
   heating the core in a mold until the polyurethane is cured, the mold defining the geometry of the panel.

3. The method of claim 2, wherein the core is made from paper honeycomb and glass layers on a top side and bottom side of the paper honeycomb.

4. The method of claim 2, wherein applying the coating of polyurethane is performed via a spraying process.

5. The method of claim 2, wherein the forming of the panel further includes applying a coating of a barrier material to the bottom surface of the core.

6. The method of claim 5, wherein one of:
   the barrier material is glass or fiber, and is applied to the bottom surface prior to applying the coating of polyurethane; or
   the barrier material is a thermoplastic polyurethane, and is placed as a film in the mold prior to the core, with the coating of polyurethane, is placed in the mold.

7. The method of claim 1, wherein the tool includes an upper panel tool and a lower panel tool, and applying the over rim coating includes:
   placing the panel between the upper panel tool and the lower panel tool with the second side facing the lower panel tool with a gap therebetween; and
   injecting the resin through the fill passage until the gap is filled.

8. The method of claim 7, wherein a fill pressure by which the resin is injected through the fill passage is between 2 bar and 200 bar.

9. The method of claim 7, wherein the gap ranges from 0.5 mm to 4.0 mm.

10. The method of claim 1, wherein the resin is a polyurethane that is at least one of:
    elastomeric or rigid; and
    aromatic or aliphatic.

11. The method of claim 1, wherein the laminating step includes adhering carpet or felt to the first side of the panel prior to applying the over rim material.

12. The method of claim 11, wherein the material of carpet or felt has an area that is larger than a surface area of the first side of the panel.

13. The method of claim 11, wherein laminating the material of carpet or felt to the first side of the panel is done via a reactive adhesive.

14. The method of claim 11, wherein the trimming the panel to the final footprint includes removing any excess material of the carpet or felt.

15. The method of claim 1, further comprising edge-wrapping a material of carpet or felt around an edge of the panel from the first side to the second side at least partially along a perimeter portion of the panel after performing final trimming of the panel.

16. The method of claim 1, wherein performing final assembly includes attaching at least one external member to the panel.

17. The method of claim 1, wherein the step of performing the final assembly to form the load structure includes installing a handle.

18. A method of manufacturing a load structure, the method comprising:
    forming a panel having a first side and a second side;
    conditioning the panel, including clearing a fill passage through the panel;
    providing a fabric to the first side of the panel;
    injecting a resin thru the fill passage to coat the second side of the panel; and
    performing final trimming of the panel;
    wherein the fill passage is at a location on the panel not provided with the fabric, the fabric is one of carpet or felt, and the fill passage is tapered with a 4 degree slope from the second side to the first side.

19. A method of manufacturing a load structure, the method comprising:
    forming a panel having a first side and a second side;

conditioning the panel, including providing a fill passage through the panel;

applying a coating on the second side of the panel;

performing a trimming step on the panel to obtain footprint of the load structure; and wrapping a fabric around an edge of the panel from the first side to the second side at least partially along a perimeter portion of the panel;

wherein the fill passage is at a location within the footprint of the load structure, and wherein the fill passage is tapered with a 4 degree slope from the second side to the first side in the side cross sectional view.

20. A method of manufacturing a load structure, the method comprising:

forming a panel having a first side and a second side;

clearing a fill passage in the panel;

providing a fabric to at least one of the first side or second side of the panel;

injecting a resin from the first side to the second side using the fill passage, the resin coats the second side of the panel; and trimming the panel;

wherein the fill passage increases in diameter, along a 4 degree slope, from the first side to the second side, the fill passage is operable to deliver resin to the second side of the panel.

* * * * *